US011866814B2

(12) United States Patent
Osuki et al.

(10) Patent No.: US 11,866,814 B2
(45) Date of Patent: Jan. 9, 2024

(54) AUSTENITIC STAINLESS STEEL

(71) Applicant: NIPPON STEEL CORPORATION, Tokyo (JP)

(72) Inventors: Takahiro Osuki, Nishinomiya (JP); Kazuhiro Ogawa, Nishinomiya (JP); Hiroyuki Hirata, Neyagawa (JP); Yoshitaka Nishiyama, Nishinomiya (JP)

(73) Assignee: NIPPON STEEL CORPORATION, Tokyo (JP)

( * ) Notice: Subject to any disclaimer, the term of this patent is extended or adjusted under 35 U.S.C. 154(b) by 801 days.

(21) Appl. No.: 16/750,137

(22) Filed: Jan. 23, 2020

(65) Prior Publication Data
US 2020/0157667 A1 May 21, 2020

Related U.S. Application Data

(63) Continuation of application No. 14/490,762, filed on Sep. 19, 2014, now abandoned, which is a continuation-in-part of application No. 13/368,665, filed on Feb. 8, 2012, now Pat. No. 8,865,060, which is a continuation-in-part of application No. 12/549,639, filed on Aug. 28, 2009, now Pat. No. 8,133,431, which is a continuation of application No. PCT/JP2008/067922, filed on Oct. 2, 2008.

(30) Foreign Application Priority Data

Oct. 4, 2007 (JP) ................. 2007-260477

(51) Int. Cl.
C22C 38/46 (2006.01)
C22C 38/48 (2006.01)
C22C 38/50 (2006.01)
C22C 38/42 (2006.01)
C22C 38/58 (2006.01)
C22C 38/00 (2006.01)
C22C 38/02 (2006.01)
C22C 38/04 (2006.01)
C22C 38/06 (2006.01)
C22C 38/40 (2006.01)
F16L 9/02 (2006.01)

(52) U.S. Cl.
CPC ............ C22C 38/58 (2013.01); C22C 38/001 (2013.01); C22C 38/002 (2013.01); C22C 38/008 (2013.01); C22C 38/02 (2013.01); C22C 38/04 (2013.01); C22C 38/06 (2013.01); C22C 38/40 (2013.01); C22C 38/42 (2013.01); C22C 38/46 (2013.01); C22C 38/48 (2013.01); C22C 38/50 (2013.01); F16L 9/02 (2013.01)

(58) Field of Classification Search
CPC ..... C22C 38/001; C22C 38/004; C22C 38/08; C22C 38/10; C22C 38/105; C22C 38/12; C22C 38/16; C22C 38/40; C22C 38/42; C22C 38/48; C22C 38/52; C22C 38/58
See application file for complete search history.

(56) References Cited

U.S. PATENT DOCUMENTS

| | | | |
|---|---|---|---|
| 3,107,997 A | 10/1963 | Kozlik | |
| 3,306,736 A | 2/1967 | Rundell | |
| 4,816,217 A * | 3/1989 | Bassford | ............... F28F 21/087 420/49 |
| 4,883,544 A | 11/1989 | Ueda et al. | |
| 4,891,080 A | 1/1990 | Del Corso | |
| 5,098,652 A | 3/1992 | Yasui | |
| 5,626,694 A * | 5/1997 | Kawabata | ............ C21D 8/0205 148/609 |
| 6,764,555 B2 | 7/2004 | Hiramatsu | |
| 7,014,720 B2 | 3/2006 | Iseda | |
| 2002/0102178 A1 | 8/2002 | Hiramatsu et al. | |
| 2003/0231976 A1 | 12/2003 | Iseda | |
| 2004/0191109 A1 | 9/2004 | Maziasz | |
| 2006/0057414 A1 | 3/2006 | Matsuo | |
| 2006/0193743 A1 | 8/2006 | Semba et al. | |

FOREIGN PATENT DOCUMENTS

| | | |
|---|---|---|
| CA | 2 680 040 | 10/2008 |
| CN | 1833043 | 9/2006 |
| EP | 0 178 374 | 4/1986 |

(Continued)

OTHER PUBLICATIONS

T. Kudo et al., "Development of 347AP Stainless Steel with High Ploythionic Acid SCC Resistance for Furnace Tubes", Sumitomo Metals, vol. 38, No. 3, Jul. 1986, pp. 190-200.

Y. Nakao et al., "Analyses of Weld Cracking in 24Cr—24Ni—1.5Nb Fe-base Heat Resisting Alloy", Journal of the JWS vol. 51, No. 1, 1982, pp. 64-69.

Y. Nakao et al., "Effect of Nb/C on the Sensitivity of Liquation Cracking in 24Cr—24Ni—1.5Nb Fe-base Heat Resisting Alloy", Journal of the JWS vol. 51, No. 12, 1982, pp. 989-995.

R. Younger et al., "Heat-affected zone cracking in welded high-temperature austenitic steels", Journal of the Iron and Steel Intitute Oct. 1960, pp. 188-194.

(Continued)

Primary Examiner — Vanessa T. Luk
(74) Attorney, Agent, or Firm — Clark & Brody LP

(57) ABSTRACT

An austenitic stainless steel, which consists of by mass percent, C: not more than 0.02%, Si: not more than 1.5%, Mn: not more than 2%, Cr: 17 to 25%, Ni: 9 to 13%, Cu: more than 0.26% not more than 4%, N: 0.06 to 0.35%, sol. Al: 0.008 to 0.03%. One or more elements selected from Nb, Ti, V, TA, Hf, and Zr in controlled amounts can be included with the balance being Fe and impurities. P, S, Sn, As, Zn, Pb and Sb among the impurities are controlled as P: 0.006 to 0.04%, S: 0.0004 to 0.03%, Sn: 0.001 to 0.1%, As: not more than 0.01%, Zn: not more than 0.01%, Pb: not more than 0.01% and Sb: not more than 0.01%. The amounts of S, P, Sn, As, Zn, Pb and Sb and the amounts of Nb, Ta, Zr, Hf, and Ti are further controlled using formulas.

12 Claims, No Drawings

(56) References Cited

FOREIGN PATENT DOCUMENTS

| JP | 41-8043 | 4/1941 |
|---|---|---|
| JP | 50-67215 | 6/1975 |
| JP | 60-224764 | 11/1985 |
| JP | 06-158234 | 6/1994 |
| JP | 06-184631 | 7/1994 |
| JP | 07-138708 | 5/1995 |
| JP | 09-267191 | 10/1997 |
| JP | 09-279313 | 10/1997 |
| JP | 09-310157 | 12/1997 |
| JP | 10-036947 | 2/1998 |
| JP | 11-256283 | 9/1999 |
| JP | 2003-268503 | 9/2003 |
| JP | 2004-277767 | 10/2004 |
| JP | 2005-023343 | 1/2005 |
| JP | 2005-023353 | 1/2005 |
| KR | 10-2003-0074232 | 9/2003 |
| KR | 10-2006-0018250 | 2/2006 |
| WO | 2006/106944 | 10/2006 |

OTHER PUBLICATIONS

Y. Ito et al., "Study on the Stress Relief Cracking in Welded Low", *Journal of the JWS*, vol. 41, No. 1, pp. 59-64, publication year: 1972.

K. Nishimoto et al., Sutenresuko no Yosetsu (Welding of Stainless Steel), Sanpo Publications, 2000, pp. 114-116.

B.W. Busch, T., "Medium-energy ion . . . W(100) surface", Surface Science, 463 (2000), pp. 145-155.

\* cited by examiner

AUSTENITIC STAINLESS STEEL

This is a continuation in part of application Ser. No. 13/368,665, filed on Feb. 8, 2012, which is a continuation in part of application Ser. No. 12/549,639, filed on Aug. 28, 2009, which is a continuation of PCT/jp2008/067922, filed on Oct. 2, 2008, which is incorporated in its entirety herein by reference.

TECHNICAL FIELD

The present invention relates to an austenitic stainless steel, particularly to an austenitic stainless steel which contains C-fixing elements. More particularly, the present invention relates to an austenitic stainless steel, which contains C-fixing elements and can be applied in manufacturing heating furnace pipes and the like which are used in power plant boilers, petroleum refining and petrochemical plants. Still more particularly, the present invention relates to an austenitic stainless steel, which contains C-fixing elements and shows excellent liquation cracking resistance and embrittling cracking resistance in a weld zone and also has high corrosion resistance, in particular high polythionic acid stress corrosion cracking resistance.

BACKGROUND ART

Due to the recent growing demand for energy, new power plant boilers, petroleum refining and petrochemical plants have been built. An austenitic stainless steel to be used in these manufacturing heating furnace pipes and the like, for use in those facilities is required to have not only excellent corrosion resistance but also excellent high temperature strength.

In such a technological background, for example, the Non-Patent Document 1 proposes a highly corrosion resistant austenitic stainless steel, having a reduced content of C together with N which is set at a level within a specified range, and containing Nb as a C-fixing element at a level within a specified range, thereby having excellent stress corrosion cracking resistance and high temperature strength, and showing no sensitizing even after a long period of aging without post heat treatment after welding.

Concerning the cracking in the Heat Affected Zone (hereinafter referred to as "HAZ") of the austenitic stainless steel which contains C-fixing elements after welding, the Non-Patent Document 2 declares that the carbide dissolution in welding thermal cycles and reheating to the $M_{23}C_6$ precipitation temperature in the subsequent cycles lead to the formation of a sensitizing region, resulting in an intergranular corrosion cracking called "knife line attack".

Further, as a result of detailed examinations using austenitic stainless steels containing Nb and C at high concentrations, the Non-Patent Document 3 and the Non-Patent Document 4 declare that the fusion of low melting point compounds, such as NbC and/or the Laves phase that has precipitated on the grain boundaries, causes liquation cracking in the HAZ. Therefore, they recommend that the precipitation of such low melting point compounds on the grain boundaries should be suppressed in order to prevent liquation cracking in the HAZ.

On the other hand, in the Non-Patent Document 5, it is pointed out that the weld zone of the 18% Cr-8% Ni type austenitic stainless heat resistant steels, undergo intergranular cracking in the HAZ after a long period of heating.

The Patent Document 1 discloses a stainless steel in which the C-fixing element is utilized. More concretely, it discloses a "stainless steel highly resistant to intergranular corrosion and intergranular stress corrosion cracking" having a specified chemical composition with Nb/C≥4 and N/C≥5. In the description that follows, "stress corrosion cracking" is referred to as "SCC".

Further, the Patent Document 2 discloses an "austenitic stainless steel containing N for use at high temperatures". More concretely, it discloses an "austenitic stainless steel containing N, which is excellent in sulfidation resistance and SCC resistance and is suited for use in a high temperature environment of 350° C. or higher where Cl— and S coexist" as resulting from the achievement of the sulfidation resistance under high temperature and high pressure conditions by an increased Cr content, improvement in chloride SCC resistance by the combined effect of increases in Cr content and Ni content and a decrease in C content and, further, the enhancement of polythionic acid SCC resistance by a reduction in C content, if necessary together with incorporation of Nb.

Patent Document 1: JP 50-67215A
Patent Document 2: JP 60-224764A
Non-Patent Document 1: Takeo Kudo et al., Sumitomo Metals, 38 (1986), p. 190
Non-Patent Document 2: Kazutoshi Nishimoto et al., Sutenresuko no Yosetsu (Welding of Stainless Steel) (2000), p. 114 [Sanpo Publications, Inc.]
Non-Patent Document 3: Yoshikuni Nakao et al., Journal of the JWS, Vol. 51 (1982), No. 1, p. 64
Non-Patent Document 4: Yoshikuni Nakao et al., Journal of the JWS, Vol. 51 (1982), No. 12, p. 989
Non-Patent Document 5: R. N. Younger et al.: Journal of the Iron and Steel Institute, October (1960), p. 188

DISCLOSURE OF INVENTION

Problems to be Solved by the Invention

The technique disclosed in the above-mentioned Non-Patent Document 1 is effective in reducing the solidification cracking susceptibility in the weld metal, since the C content is reduced to a low level and the content of Nb necessary for the stabilization of C is also reduced. However, no attention is paid to the occurrence, in the HAZ, of liquation cracking and of embrittling cracking during a long period of use. Therefore, the austenitic stainless steel containing the C-fixing element described in the Non-Patent Document 1 is indeed excellent in corrosion resistance and has excellent high temperature strength, but the said austenitic stainless steel cannot avoid the above-mentioned two kinds of cracking in the HAZ just after fabrication by the high heat input TIG welding and during a long period of use at high temperatures.

The intergranular corrosion cracking reported in the Non-Patent Document 2 is quite different from the liquation cracking on grain boundaries of HAZ which occurs during welding before exposure to the corrosive environment mentioned above.

The techniques proposed in the Non-Patent Document 3 and the Non-Patent Document 4 are effective in reducing cracking susceptibility in the HAZ when the C content is in a high C range exceeding 0.1%, and also the Nb is in a high Nb range exceeding 1%. However, the occurrence of the liquation cracking in the HAZ cannot be avoided as yet in a region where the C content is reduced to a level of lower than 0.05% and also the Nb content is reduced to a level of 0.5% or less in order to improve corrosion resistance. In addition, when the austenitic stainless steels disclosed in the Non-Patent Document 3 and the Non-Patent Document 4 are used in the fields where corrosion resistance is required, the occurrence of sensitizing corrosion in the HAZ also cannot be avoided, since the C content is high.

Although the above-mentioned Non-Patent Document 5 suggests that such carbides as $M_{23}C_6$ and NbC act as factors influencing the cracking in the HAZ, it does not explain the mechanisms thereof. Moreover, the technique disclosed in the Non-Patent Document 5 is nothing but a means for avoiding embrittling cracking in the HAZ after a long period of heating; it is not always applicable to cope with the liquation cracking in the HAZ just after welding.

Regarding the steel proposed in the Patent Document 1, the polythionic acid SCC resistance thereof is enhanced by reducing the C content and increasing the N content. However, such measures alone cannot suppress polythionic acid SCC under server conditions as well. Furthermore, the mere C content reduction and N content increase cannot simultaneously enhance the liquation cracking resistance and embrittling cracking resistance in the weld zone.

The steel proposed in the Patent Document 2 is improved only in sulfidation resistance and SCC resistance; the liquation cracking resistance and embrittling cracking resistance thereof cannot be simultaneously enhanced. Moreover, the steel cannot be suppressed from undergoing SCC, in particular polythionic acid SCC, under severer conditions.

The phenomena of the liquation cracking in the HAZ and the cracking in the HAZ during a long period of use in highly corrosion resistant austenitic stainless steels, in which C-fixing elements are utilized, have been known for long time, as mentioned above. As for the liquation cracking in the HAZ, however, neither the mechanisms of occurrence of the liquation cracking in an area in which the C content is low and the content of the C-fixing element is also low, nor the measures thereof have yet been established. As for the cracking in the HAZ during a long period of use as well, no complete mechanisms have yet been clarified and, further, the measures thereof, in particular the measures from the material viewpoint, have not yet been established.

In view of the above-mentioned state of affairs, it is an objective of the present invention to provide an austenitic stainless steel which has C-fixing elements and can be suppressed from undergoing liquation cracking in the HAZ on the occasion of welding, and moreover is excellent in embrittling cracking resistance in the HAZ during a long period of use at high temperatures and is highly resistant to corrosion, in particular to polythionic acid SCC.

Means for Solving the Problems

The present inventors made detailed investigations concerning the mechanisms of the occurrence of liquation cracking, embrittling cracking and polythionic acid SCC in order to provide an austenitic stainless steel which has C-fixing elements and can be suppressed from undergoing liquation cracking in the HAZ after welding (hereinafter "liquation cracking in the HAZ after welding" is also referred to as "liquation cracking" for short) and also can be suppressed from undergoing embrittling cracking in the HAZ during a long period of use at high temperatures (hereinafter "embrittling cracking in the HAZ during a long period of use at high temperatures" is also referred to as "embrittling cracking" for short) and is highly resistant to corrosion, in particular to polythionic acid SCC.

As a result, the following findings (a) and (b) were first obtained concerning the occurrence of liquation cracking.

(a) In a case of austenitic stainless steels which have a C content lower than 0.05%, in particular lower than 0.04%, and also have low contents of C-fixing elements, the Cr carbonitrides precipitate on the grain boundaries, since the carbides resulting from binding of the said C-fixing elements to C have low precipitation temperatures. On the other hand, the carbides of the said C-fixing elements precipitate within grains.

(b) The above finding (a) indicates that the mechanisms of occurrence of the liquation cracking are fundamentally different from those described in the above-mentioned Non-Patent Document 3 and Non-Patent Document 4, that is to say, the mechanisms of the occurrence involving the fusion of the low melting point compounds such as NbC and/or the Laves phase that has precipitated on the grain boundaries.

Then, further examinations and investigations were made and the following findings (c) to (h) were obtained.

(c) When austenitic stainless steels, having a microstructure in which the Cr carbonitrides precipitate on the grain boundaries and the carbides of C-fixing elements precipitate within grains, which have a C content lower than 0.05%, in particular lower than 0.04%, as mentioned above, and have low contents of C-fixing elements are heated to high temperatures by welding thermal cycles, the C-fixing element carbides such as NbC, which have primarily precipitated within the grains are dissolved. Consequently, the pinning effect of the precipitates on the crystal grain growth is lost and the crystal grains in the HAZ, which are heated to just below the melting point, become very coarse and, accordingly, the surface area of grain boundaries are markedly reduced.

(d) Upon heating at high temperatures, the C-fixing elements and the C that have dissolved within grains, diffuse within grains and segregate on the grain boundaries. In addition, in the area heated to just below the melting point, the surface area of the grain boundaries becomes markedly reduced as a result of the coarsening of the crystal grains. Consequently, it is presumed that the extent of such segregation on the grain boundaries is higher compared with other areas.

(e) Therefore, in the HAZ heated to just below the melting point, the decrease of the surface area on grain boundaries due to marked coarsening of crystal grains results in a concentration of the C-fixing elements and/or C on the grain boundaries compared with other areas heated to lower temperatures, and the very melting point of the grain boundaries falls.

(f) Such elements as P and S, being contained in the base metal, which show a marked tendency toward segregation on grain boundaries also segregate to the grain boundaries in HAZ. Therefore, the melting point of grain boundaries in the coarse-grained HAZ falls markedly.

(g) The said crystal grain boundaries, which have lower melting points, are melted upon heating in the welding thermal cycles in the second pass and thereafter. Then the grain boundaries are liquefied and the liquation cracking mentioned hereinabove occurs.

(h) In order to prevent the above-mentioned liquation cracking, it is presumably effective to increase the contents of the C-fixing elements to thereby stabilize the carbides until higher temperatures. On the other hand, when the content of C-fixing elements is excessive, it is feared that the corrosion resistance deteriorates due to the increase in the Cr-sensitizing region.

Therefore, in order to prevent liquation cracking in the HAZ while maintaining high corrosion resistance, it is effective to reduce impurity elements such as P and S in the steel and at the same time optimize the content of C-fixing elements.

As for the above-mentioned embrittling cracking, the following findings (i) to (k) were obtained.

(i) The said embrittling cracking occurs on the crystal grain boundaries of the so-called "coarse-grained HAZ" which is exposed to high temperatures during the welding.

(j) The fractured surface of the said embrittling cracking is poor in ductility, and concentrations of such elements as P, S, Sn and so on, which act on grain boundaries as embrittlement-causing elements, are found on the fractured surface.

(k) The microstructure in the vicinity of the said cracking shows a large amount of carbides and nitrides that have precipitated within crystal grains.

Based on the above findings (i) to (k), the present inventors drew the following conclusions (l) to (n) concerning the mechanisms of occurrence of the said embrittling cracking.

(l) During welding thermal cycles and the subsequent use at high temperatures, such elements as P, S and Sn, which act on grain boundaries as embrittlement-causing elements, segregate to the grain boundaries. In particular, these elements segregate markedly to the coarse-grained HAZ which has a small surface area of grain boundaries and, therefore, the grain boundaries become markedly embrittled.

(m) When external stress is applied during the use at high temperatures, the intragranular deformation is suppressed by a large amount of intragranular precipitates of carbonitrides and nitrides, typically carbide-fixing element carbides such as NbC and TiC. Therefore, stress concentration occurs on the interface of the said embrittled grain boundaries and an orifice develops at the grain boundaries, and this leads a easy occurrence of the said embrittling cracking. In particular, the said stress concentration on the grain boundary interface is promoted in areas where the crystal grain diameter is large, such as in the coarse-grained HAZ, hence the said embrittling cracking will very readily occur there.

(n) Regarding the cracking which shows the similar cracking mode to the above-mentioned embrittling cracking, for example, there is the SR cracking in low alloy steels mentioned by Ito et al. in the Journal of the JWS, Vol. 41 (1972), No. 1, p. 59. However, the said SR cracking in those low alloy steels is a cracking which occurs in the step of a short period SR heat treatment after welding and is quite different in timing from the above-mentioned embrittling cracking which occurs in the HAZ during the long period of use at high temperatures. In addition, the base metal of the said low alloy steels has a ferritic microstructure and the mechanisms of occurrence of SR cracking therein are quite different from those in the austenitic microstructure, which is the intention of the present invention. Therefore, as a matter of course, the measure for preventing the above-mentioned SR cracking in low alloy steels as such, cannot be applied as a measure for preventing the embrittling cracking which occurs in the HAZ during a long period of use at high temperatures. Consequently, in order to prevent this kind of embrittling cracking, it is effective to take the following measures <1> and <2>:

<1> Suppression of intragranular carbide precipitation by reducing the content of C-fixing elements;

<2> Reduction of the content of such elements as P, S and Sn, which act on grain boundaries as embrittlement-causing elements, in the steel:

As mentioned above, it has been revealed that the reduction in the content of those elements which segregate to grain boundaries and thus embrittle grain boundaries, such as P, S and Sn, is effective as a measure for preventing both the liquation cracking after welding and the embrittling cracking in the HAZ during a long period of use at high temperatures. However, the influence of contents of the C-fixing elements on the said liquation cracking and on the said embrittling cracking is the contrary.

Furthermore, the following finding (o) was obtained concerning the said polythionic acid SCC.

(o) When the content of impurity elements showing a tendency toward segregation to grain boundaries, such as P, S, Sn, Sb and Pb, is high, the polythionic acid SCC resistance, in particular in the HAZ, deteriorates. Intergranular SCC such as polythionic acid SCC is a corrosion generally caused by synergistic actions of intergranular corrosion and stress. Therefore, although the mechanisms involved have not yet been fully clarified, it is considered that since the intergranular segregation of impurity elements facilitate intergranular corrosion and the grain boundary itself is embrittled, the intergranular SCC in a polythionic acid environment be promoted by those synergistic actions.

On the supposition that both the above-mentioned liquation cracking and embrittling cracking might be prevented, and also the required level of strength might be secured and the SCC resistance in a polythionic acid environment might be improved, by optimizing the amount of carbide precipitates within the grains and at the same time by reducing the extent of intergranular segregation, the present inventors made detailed investigations in search of optimum content levels of Nb, Ti, Ta, Zr, Hf and V, which are C-fixing elements, and also of S, P, Sn, Sb, Pb, Zn and As, which segregate in grain boundaries and embrittle grain boundaries. As a result, the following important findings (p) to (s) were obtained.

(p) In order to prevent both the above-mentioned liquation cracking and embrittling cracking and to improve the polythionic acid SCC resistance, it is important to restrict the contents of P, S, Sn, Sb, Pb, Zn and As, which segregate to grain boundaries and embrittle grain boundaries, within respective specific ranges.

(q) Among the elements mentioned above, S is the most harmful one, followed by P and Sn. Therefore, in order to prevent the above-mentioned two kinds of cracking and to improve the polythionic acid SCC resistance, it becomes essential, in addition to restricting the contents of the respective elements, that the value of the parameter F1 defined by the formula (1) given below as derived by taking into consideration the weights of the influences of the respective elements should be not more than 0.075; in the formula, each element symbol represents the content by mass percent of the element concerned:

$$F1 = S + \{(P+Sn)/2\} + \{(As+Zn+Pb+Sb)/5\} \quad (1).$$

(r) When, in particular, the contents of Nb, Ti, Ta, Zr, Hf and V, which are the C-fixing elements, are adjusted within respective specific ranges according to the contents of the above-mentioned elements P, S, Sn, Sb, Pb, Zn and As, which segregate to grain boundaries and embrittle grain boundaries, it becomes possible to secure the required level of strength and improve the SCC resistance in a polythionic acid environment and, in addition, prevent both the above-mentioned liquation cracking and embrittling cracking.

(s) Ti, in particular, among the above-mentioned C-fixing elements exerts the greatest influence, followed by Ta, Nb, Zr and Hf. Therefore, in order to secure the required strength and to improve the SCC resistance in a polythionic acid environment and at the same time to prevent the above-mentioned two kinds of cracking, it is essential, in addition to restricting the contents of the respective elements, that the value of the parameter F2 defined by the formula (2) given below as derived by taking into consideration the weights of the influences of the respective elements should be not less than 0.05 and the upper limit thereto should be set at [1.7-9×F1]; in the formula, each element symbol represents the content by mass percent of the element concerned:

$$F2 = Nb + Ta + Zr + Hf + 2Ti + (V/10) \qquad (2).$$

The present invention has been accomplished on the basis of the above-described findings. The main points of the present invention are austenitic stainless steels shown in the following (1) to (3).

(1) An austenitic stainless steel, which comprises by mass percent, C: less than 0.04%, Si: not more than 1.5%, Mn: not more than 2%, Cr: 15 to 25%, Ni: 6 to 30%, N: 0.02 to 0.35%, sol. Al: not more than 0.03% and further contains one or more elements selected from Nb: not more than 0.5%, Ti: not more than 0.4%, V: not more than 0.4%, Ta: not more than 0.2%, Hf not more than 0.2% and Zr: not more than 0.2%, with the balance being Fe and impurities, in which the contents of P, S, Sn, As, Zn, Pb and Sb among the impurities are P: not more than 0.04%, S: not more than 0.03%, Sn: not more than 0.1%, As: not more than 0.01%, Zn: not more than 0.01%, Pb: not more than 0.01% and Sb: not more than 0.01%, and the values of F1 and F2 defined respectively by the following formula (1) and formula (2) satisfy the conditions F1≤0.075 and 0.05≤F2≤1.7-9×F1;

$$F1 = S + \{(P+Sn)/2\} + \{(As+Zn+Pb+Sb)/5\} \qquad (1),$$

$$F2 = Nb + Ta + Zr + Hf + 2Ti + (V/10) \qquad (2);$$

In the formulas (1) and (2), each element symbol represents the content by mass percent of the element concerned.

(2) An austenitic stainless steel, which comprises by mass percent, C: less than 0.05%, Si: not more than 1.5%, Mn: not more than 2%, Cr: 15 to 25%, Ni: 6 to 13%, N: 0.02 to 0.1%, sol. Al: not more than 0.03% and further contains one or more elements selected from Nb: not more than 0.5%, Ti: not more than 0.4%, V: not more than 0.4%, Ta: not more than 0.2%, Hf: not more than 0.2% and Zr: not more than 0.2%, with the balance being Fe and impurities, in which the contents of P, S, Sn, As, Zn, Pb and Sb among the impurities are P: not more than 0.04%, S: not more than 0.03%, Sn: not more than 0.1%, As: not more than 0.01%, Zn: not more than 0.01%, Pb: not more than 0.01% and Sb: not more than 0.01%, and the values of F1 and F2 defined respectively by the following formula (1) and formula (2) satisfy the conditions F1≤0.075 and 0.05≤F2≤1.7-9×F1;

$$F1 = S + \{(P+Sn)/2\} + \{(As+Zn+Pb+Sb)/5\} \qquad (1),$$

$$F2 = Nb + Ta + Zr + Hf + 2Ti + (V/10) \qquad (2);$$

In the formulas (1) and (2), each element symbol represents the content by mass percent of the element concerned.

(3) The austenitic stainless steel according to the above (1) or (2), which further contains, by mass percent, one or more elements of one or more groups selected from the first to third groups listed below in lieu of a part of Fe:

First group: Cu: not more than 4%, Mo: not more than 5%, W: not more than 5% and Co: not more than 1%;

Second group: B: not more than 0.012%; and

Third group: Ca: not more than 0.02%, Mg: not more than 0.02% and rare earth element: not more than 0.1%.

The term "rare earth element" (hereinafter referred to as "REM") refers to a total of 17 elements including Sc, Y and lanthanoid collectively, and the REM content mentioned above means the content of one or the total content of two or more of the REM.

Hereinafter, the above-mentioned inventions (1) to (3) related to the austenitic stainless steels are referred to as "the present invention (1)" to "the present invention (3)", respectively. They are sometimes collectively referred to as "the present invention".

Effects of the Invention

The austenitic stainless steels of the present invention have excellent liquation cracking resistance and embrittling cracking resistance in a weld zone, and moreover they have excellent polythionic acid SCC resistance and high temperature strength. Consequently, they can be used as raw materials for various apparatuses which are used in a sulfide-containing environment at high temperatures for a long period of time; for example in power plant boilers, petroleum refining and petrochemical plants and so on.

BEST MODES FOR CARRYING OUT THE INVENTION

In the following, the reasons for restricting the contents of the component elements of the austenitic stainless steels in the present invention are described in detail. In the following description, the symbol "%" for the content of each element means "% by mass".

C: less than 0.05%

From the viewpoint of securing corrosion resistance, in particular polythionic acid SCC resistance, the content of C is desirably as low as possible so that the sensitizing due to precipitation of Cr carbides formed by its binding to Cr may be suppressed. On the other hand, C is an element having an austenite-forming effect and at the same time forming fine carbides within the grains thereby contributing to improvements in high temperature strength. Therefore, from the viewpoint of securing high temperature strength, a content of C corresponding to the content of carbide-forming elements is preferable for the purpose of strengthening by carbides which precipitate within the grains. However, when the C content is excessive, in particular at a content level of 0.05% or more, C causes an increase in susceptibility to weld solidification cracking and, in addition, causes marked deterioration in corrosion resistance. Therefore, the C content of the present invention (2) is set to less than 0.05%. The content of C is more preferably less than 0.04%. Therefore the C content of the present invention (1) is set to less than 0.04%. The content of C is still more preferably less than 0.03% and most preferably not more than 0.02%.

Si: not more than 1.5%

Si is an element which has a deoxidizing effect during the step of melting the austenitic stainless steels. It is also effective in increasing the oxidation resistance, steam oxidation resistance and so on. However, when the content thereof is excessive, in particular at a content level exceeding 1.5%, it causes a marked increase in weld cracking susceptibility and, since Si is a ferrite-forming element, it deteriorates the stability of the austenite phase. Therefore, the content of Si is set to not more than 1.5%. The content of Si is preferably not more than 1%, more preferably not more than 0.75%. On the other hand, in order to ensure the above-mentioned effects of Si, the lower limit of the Si content is preferably set to 0.02%. The lower limit of the Si content is more preferably 0.1%.

Mn: not more than 2%

Mn is an austenite-forming element and, at the same time, it is an element effective in preventing the hot working brittleness due to S and in deoxidation during the step of melting. However, if the content of Mn exceeds 2%, Mn promotes the precipitation of such intermetallic compound phases as the σ phase and also causes a decrease in toughness and ductility due to the deterioration in microstructural stability at high temperatures in case of use in a high temperature environment. Therefore, the content of Mn is set to not more than 2%. The content of Mn is preferably not more than 1.5%. The lower limit of the Mn content is preferably set to 0.02% and the lower limit of the Mn content is more preferably 0.1%.

Cr: 15 to 25%

Cr is an essential element for ensuring the oxidation resistance and corrosion resistance at high temperatures and, in order to obtain the said effects, it is necessary that the Cr content be not less than 15%. However, when the content thereof is excessive, in particular at a content level exceeding 25%, it deteriorates the stability of the austenite phase at high temperatures and thus causes a decrease in creep strength. Therefore, the content of Cr is set to 15 to 25%. The preferable lower limit of the Cr content is 17% and the preferable upper limit thereof is 20%.

Ni: 6 to 30%

Ni is an essential element for ensuring a stable austenitic microstructure and is also an essential element for ensuring the microstructural stability during a long period of use and thus obtaining the desired level of creep strength. However, in order to obtain the said effects, the balance with the Cr content mentioned above is important and a Ni content of not less than 6% is required relative to the lower limit of the Cr content in the present invention. On the other hand, the addition of the expensive element Ni in an amount exceeding 30% results in an increase in cost. Therefore, the Ni content of the preset invention (1) is set to 6 to 30%. The upper limit of the Ni content is preferably set to 20% and the upper limit of the Ni content is more preferably 13%. Therefore, the Ni content of the present invention (2) is set to 6 to 13%. The upper limit of the Ni content is most preferably set to 12%. The lower limit of the Ni content is preferably set to 7% and the lower limit of the Ni content is more preferably 9%.

N: 0.02 to 0.35%

N is an austenite-forming element and is an element soluble in the matrix and precipitates as the fine carbonitrides within the grains and thus effective in improving the creep strength. In order to obtain these effects sufficiently, the content of N is required to be not less than 0.02%. However, when the N content is excessive, and at a content level of more than 0.35%, Cr nitrides are formed on the grain boundaries and, therefore, the polythionic acid SCC resistance in the HAZ deteriorates due to the resulting sensitization. Therefore, the content of N is set to 0.02 to 0.35%. The lower limit of the N content is preferably set to 0.04% and the lower limit of the N content is more preferably 0.06%. The upper limit of the N content is preferably set to 0.3% and the upper limit of the N content is more preferably 0.1%.

Sol. Al: not more than 0.03%

Al has a deoxidizing effect but, at high additional levels, it markedly impairs the cleanliness and deteriorates the workability and ductility; in particular, when the Al content exceeds 0.03% as sol. Al ("acid-soluble Al"), it causes a marked decrease in workability and ductility. Therefore, the content of sol. Al is set to not more than 0.03%. The lower limit of the sol. Al content is not particularly restricted, however the lower limit of the sol. Al content is preferably 0.0005%.

One or more elements selected from Nb: not more than 0.5%, Ti: not more than 0.4%, V: not more than 0.4%, Ta: not more than 0.2%, Hf: not more than 0.2% and Zr: not more than 0.2%

Nb, Ti, V, Ta, Hf and Zr, which are the C-fixing elements, constitute an important group of elements which form the basis of the present invention. That is to say, when these elements bind to C to form carbides and the carbides precipitate within grains, the precipitation of the Cr carbides on the grain boundaries is suppressed and the sensitizing is prevented, and hence high levels of corrosion resistance can be ensured. Furthermore, the above-mentioned carbides that have precipitated within grains also contribute to improvement in creep strength. However, when the content of the above-mentioned elements is excessive, the dissolution temperature of the said carbides in the welding thermal cycles rises. Therefore, the segregation of the above-mentioned elements, caused by the dissolution of the carbides on the grain boundaries in a coarse-grained HAZ is reduced. Consequently, the liquation cracking on the grain boundaries, due to exposure to thermal cycles in the next layer welding can be prevented. However, on the other hand, the carbides precipitate excessively within grains and the intragranular deformation is hindered thereby, causing further stress concentration on the grain boundary interface that has become fragile due to the segregation of the impurity elements to be mentioned later herein, the result of the embrittling cracking in the coarse-grained HAZ during a long period of use at high temperatures is promoted. Furthermore, the Cr-sensitized region is enlarged, such as in the so-called "knife line attack", resulting in marked deterioration of the corrosion resistance. In particular, when the content of Nb exceeds 0.5% or when the content of each of Ti and V exceeds 0.4% and, further, when the content of each of Ta, Hf and Zr exceeds 0.2%, the above-mentioned harmful influences become significant. Therefore, in order to ensure a high level of corrosion resistance and to suppress both the liquation cracking after welding and the embrittling cracking during a long period of use, the content of each of Nb, Ti, V, Ta, Hf and Zr is set to as follows: Nb: not more than 0.5%, Ti: not more than 0.4%, V: not more than 0.4%, Ta: not more than 0.2%, Hf: not more than 0.2% and Zr: not more than 0.2%.

The upper limit of each of the contents of the above-mentioned elements is preferably as follows: 0.4% for Nb, 0.3% for Ti, 0.2% for V, 0.15% for Ta, 0.15% for Hf and 0.1% for Zr.

The steels of the present invention can contain only one or a combination of two or more of the above-mentioned elements selected from Nb, Ti, V, Ta, Hf and Zr. However, in order to secure excellent polythionic acid SCC resistance, it is necessary that the value of the said parameter F2 mentioned hereinabove should be set to not less than 0.05 and, in order to reduce the cracking susceptibility in the HAZ just after welding and during a long period of use, it is necessary that the upper limit of the value of the said parameter F2 should be set to [1.7-9×F1], as described later herein.

In the present invention, it is necessary to restrict the contents of P, S, Sn, As, Zn, Pb and Sb among the impurities to not more than the specified levels.

That is to say, all of the above-mentioned elements segregate on the grain boundaries in the coarse-grained HAZ during welding thermal cycles or during the subsequent use at high temperatures, and lower the melting point of the grain boundaries together with the binding force of the grain boundaries, and thus, cause liquation cracking due to fusion of the grain boundaries in the coarse-grained HAZ upon exposure to thermal cycles in the next layer welding step or embrittling cracking during use at high temperatures. In addition, these elements promote intergranular corrosion and lower the strength of grain boundaries, and therefore lead to the deterioration in polythionic acid SCC resistance. Therefore, first, it is necessary to restrict the contents thereof as follows: P: not more than 0.04%, S: not more than 0.03%, Sn: not more than 0.1%, As: not more than 0.01%, Zn: not more than 0.01%, Pb: not more than 0.01% and Sb: not more than 0.01%.

Among the elements mentioned above, S exerts the most harmful influence on the liquation cracking in the coarse-grained HAZ after welding and on the embrittling cracking and polythionic acid SCC resistance during a long period of use, followed by the harmful influences of P and Sn. In order to prevent both the above-mentioned liquation cracking and embrittling cracking and also to improve the polythionic acid SCC resistance as well, it is necessary that the value of the parameter F1 mentioned hereinabove should be not more than 0.075 and that this parameter F1, in relation to the parameter F2, should satisfy the condition [F2≤1.7-9×F1]. These requirements will be explained below.

The value of the parameter F1: not more than 0.075

When the value of F1 defined by the said formula (1), that is to say, by [S+{(P+Sn)/2}+{(As+Zn+Pb+Sb)/5}], exceeds 0.075, it becomes impossible to prevent the decrease in grain boundary binding force and, therefore, the occurrence of liquation cracking in the coarse-grained HAZ after welding, and of embrittling cracking during a long period of use. Further, the deterioration in polythionic acid SCC resistance cannot be avoided. Therefore, it is necessary that the value of the parameter F1 should be set to not more than 0.075. It is preferable that the value of the parameter F1 is reduced as low as possible.

The value of the parameter F2: not less than 0.05 to not more than [1.7-9×F1]

When the value of F2 defined by the said formula (2), that is to say, by [Nb+Ta+Zr+Hf+2Ti+(V/10)], is not less than 0.05, excellent polythionic acid SCC resistance can be ensured. And, when the value of F2 satisfies the condition of not more than [1.7-9×F1] in relation to the above-mentioned parameter F1, it becomes possible to prevent the liquation cracking in the coarse-grained HAZ after welding and the embrittling cracking during a long period of use.

From the reasons mentioned above, the austenitic stainless steels according to the present inventions (1) and (2) are defined as the ones which contain the above-mentioned elements C to sol. Al within their respective content ranges and further contain one or more elements selected from Nb, Ti, V, Ta, Hf and Zr within their respective content ranges, with the balance being Fe and impurities, in which the contents of P, S, Sn, As, Zn, Pb and Sb among the impurities are within their respective content ranges, and the values of F1 and F2 defined respectively by the said formulas (1) and (2) satisfy the conditions F1≤0.075 and 0.05≤F2≤1.7-9×F1.

The austenitic stainless steels according to the present invention (1) or the present invention (2) can further selectively contain, according to need, one or more elements of each of the following groups of elements in lieu of a part of Fe:

First group: Cu: not more than 4%, Mo: not more than 65%, W: not more than 5% and Co: not more than 1%;

Second group: B: not more than 0.012%; and

Third group: Ca: not more than 0.02%, Mg: not more than 0.02% and REM: not more than 0.1%.

That is to say, one or more of the first to third groups of elements may be added, as optional element(s), to the above-mentioned steels and thereby contained therein.

The above-mentioned optional elements will be explained below.

First group: Cu: not more than 4%, Mo: not more than 5%, W: not more than 5% and Co: not more than 1%

Each of Cu, Mo, W and Co being elements of the first group, if added, has the effect of enhancing the high temperature strength. In order to obtain this effect, the said elements may be added to the steels and thereby contained therein. The elements, which are in the first group, are now described in detail.

Cu: not more than 4%

Cu precipitates finely at high temperatures. Therefore, Cu is an effective element which enhances high temperature strength. Cu is also effective in stabilizing the austenite phase. However, when the content of Cu is increased, the Cu phase precipitation becomes excessive and the susceptibility to embrittling cracking in the coarse-grained HAZ increases; in particular when the content of Cu exceeds 4%, the susceptibility to embrittling cracking in the coarse-grained HAZ becomes markedly higher. Therefore, if Cu is added, the content of Cu is set to not more than 4%. The content of Cu is preferably set to not more than 3% and the content of Cu is more preferably not more than 2%. On the other hand, in order to ensure the above-mentioned effects, the lower limit of the Cu content is preferably set to 0.02% and the lower limit of the Cu content is more preferably 0.05%.

Mo: not more than 5%

Mo dissolves in the matrix and is an element which makes a contribution to the enhancement of high temperature strength, in particular to the enhancement of creep strength at high temperatures. Mo is also effective in suppressing the precipitation of Cr carbides on the grain boundaries. However, when the content of Mo is increased, the stability of the austenite phase deteriorates; hence the creep strength is rather low, and moreover, the susceptibility to embrittling cracking in the coarse-grained HAZ increases. In particular, when the content of Mo exceeds 5%, the creep strength markedly deteriorates and, at the same time, the susceptibility to embrittling cracking in the coarse-grained HAZ becomes markedly higher. Therefore, if Mo is added, the content of Mo is set to not more than 5%. The content of Mo is preferably not more than 1.5%. On the other hand, in order to ensure the above-mentioned effects, the lower limit of the Mo content is preferably set to 0.05%.

W: not more than 5%

W also dissolves in the matrix and is an element which makes a contribution to the enhancement of high temperature strength, in particular to the enhancement of creep strength at high temperatures. However, when the content of W is increased, the stability of the austenite phase deteriorates, hence the creep strength is rather low, and moreover, the susceptibility to embrittling cracking in the coarse-grained HAZ increases. In particular, when the content of W exceeds 5%, the creep strength markedly deteriorates and, at the same time, the susceptibility to embrittling cracking in the coarse-grained HAZ becomes markedly higher. Therefore, if W is added, the content of W is set to not more than 5%. The content of W is preferably set to not more than 3% and the content of W is more preferably not more than 1.5%. On the other hand, in order to ensure the above-mentioned effects, the lower limit of the W content is preferably set to 0.05%.

Co: not more than 1%

Like Ni, Co increases the stability of the austenite phase and makes a contribution to the enhancement of high temperature strength. However, Co is a very expensive element and, therefore, an increased content thereof results in an increase in cost. In particular, when the content of Co exceeds 1%, the cost markedly increases. Therefore, if Co is added, the content of Co is set to not more than 1%. The content of Co is preferably set to not more than 0.8% and the content of Co is more preferably not more than 0.5%. The Co content is further preferably not more that 0.28%. On the other hand, in order to ensure the above-mentioned effects, the lower limit of the Co content is preferably set to 0.03%.

The steels of the present invention can contain only one or a combination of two or more of the above-mentioned Cu, Mo, W and Co.

Second group: B: not more than 0.012%

B, which is the element of the second group, if added, has the effect of strengthening the grain boundaries. In order to obtain this effect, B may be added to the steels and thereby contained therein. B, which is in the second group, is now explained in detail.

B: not more than 0.012%

B segregates on the grain boundaries and also disperses carbides precipitating on the grain boundaries finely, and is an element which makes a contribution to strengthening the grain boundaries. However, an excessive addition of B lowers the melting point of the grain boundaries; in particular, when the content of B exceeds 0.012%, the decrease of the grain boundary melting point becomes remarkable, and therefore, in the step of welding, the liquation cracking on the grain boundaries in the HAZ vicinity to the fusion line occurs. Therefore, if B is added, the content of B is set to not more than 0.012%. The content of B is preferably not more than 0.005% and more preferably not more than 0.0045%. On the other hand, in order to ensure the above-mentioned effect, the lower limit of the B content is preferably set to 0.0001%. The lower limit of the B content is more preferably 0.001%.

Third group: one or more elements selected from Ca: not more than 0.02%, Mg: not more than 0.02% and REM: not more than 0.1%.

Each of Ca, Mg and REM being elements of the third group, if added, has the effect of increasing the hot workability. In order to obtain this effect, the said elements may be added to the steels and thereby contained therein. The elements, which are in the third group, are now described in detail.

Ca: not more than 0.02%

Ca has a high affinity for S and so, it has an effect of improving the hot workability. Ca is also effective, although to a slight extent, in reducing the possibility of the embrittling cracking in the coarse-grained HAZ which is caused by the segregation of S on the grain boundaries. However, an excessive addition of Ca causes deterioration of cleanliness, in other words, an increase of the index of cleanliness, due to the binding thereof to oxygen; in particular, when the content of Ca exceeds 0.02%, the deterioration of the cleanliness markedly increases and the hot workability rather deteriorates. Therefore, if Ca is added, the content of Ca is set to not more than 0.02%. The content of Ca is preferably not more than 0.01%. On the other hand, in order to ensure the above-mentioned effects, the lower limit of the Ca content is preferably set to 0.0001% and the lower limit of the Ca content is more preferably 0.0005%.

Mg: not more than 0.02%

Mg also has a high affinity for S and so, it has an effect of improving the hot workability. Mg is also effective, although to a slight extent, in reducing the possibility of the embrittling cracking in the coarse-grained HAZ which is caused by the segregation of S on the grain boundaries. However, an excessive addition of Mg causes deterioration of cleanliness due to the binding thereof to oxygen; in particular, when the content of Mg exceeds 0.02%, the deterioration of the cleanliness markedly increases and the hot workability rather deteriorates. Therefore, if Mg is added, the content of Mg is set to not more than 0.02%. The content of Mg is preferably not more than 0.01%. On the other hand, in order to ensure the above-mentioned effects, the lower limit of the Mg content is preferably set to 0.0001%.

REM: not more than 0.1%

REM has a high affinity for S and so, it has an effect of improving the hot workability. REM is also effective in reducing the possibility of the embrittling cracking in the coarse-grained HAZ which is caused by the segregation of S on the grain boundaries. However, an excessive addition of REM causes deterioration of cleanliness due to the binding thereof to oxygen; in particular, when the content of REM exceeds 0.1%, the deterioration of the cleanliness markedly increases and the hot workability rather deteriorates. Therefore, if REM is added, the content of REM is set to not more than 0.1%. The content of REM is preferably not more than 0.05%. On the other hand, in order to ensure the above-mentioned effects, the lower limit of the REM content is preferably set to 0.001%.

As already mentioned hereinabove, the term "REM" refers to a total of 17 elements including Sc, Y and lanthanoid collectively, and the REM content means the content of one or the total content of two or more of the REM.

The steels of the present invention can contain only one or a combination of two or more of the above-mentioned Ca, Mg and REM.

From the reasons mentioned above, the austenitic stainless steel according to the present invention (3) is defined as the one which contains one or more elements of one or more groups selected from the first to third groups listed below in lieu of a part of Fe in the austenitic stainless steel according to the present invention (1) or (2):

first group: Cu: not more than 4%, Mo: not more than 5%, W: not more than 5% and Co: not more than 1%;
second group: B: not more than 0.012%; and
third group: Ca: not more than 0.02%, Mg: not more than 0.02% and REM: not more than 0.1%.

The austenitic stainless steels, according to the present inventions (1) to (3), can be produced by selecting the raw materials to be used in the melting step based on the results of careful and detailed analyses so that, in particular, the contents of Sn, As, Zn, Pb and Sb among the impurities may fall within the above-mentioned respective ranges, namely Sn: not more than 0.1%, As: not more than 0.01%, Zn: not more than 0.01%, Pb: not more than 0.01% and Sb: not more than 0.01% and the values of F1 and F2 respectively defined by the said formula (1) and formula (2) satisfy the conditions F1≤0.075 and 0.05≤F2≤1.7−9×F1, respectively and then melting the materials using an electric furnace, an AOD furnace or a VOD furnace.

Next, a slab, a bloom or a billet is produced by casting the molten metal, which is prepared by a melting process, into an ingot by the so-called "ingot making method" and subjecting the ingot to hot working, or by continuous casting. Then, in the case of plate manufacturing, for example, the said raw material is subjected to hot rolling into a plate or a coil shaped sheet. Or, in the case of pipe manufacturing, for instance, any of such raw materials is subjected to hot working into a tubular product by the hot extrusion pipe manufacturing process or Mannesmann pipe manufacturing process.

That is to say, the hot working may use any hot working process. For example, in a case where the final product is a steel pipe or tube, the hot working may include the hot extrusion pipe manufacturing process represented by the Ugine-Sejournet process, the hot pushing pipe manufacturing process, and/or the rolling pipe manufacturing process (Mannesmann pipe manufacturing process) represented by the Mannesmann-Plug Mill rolling process or the Mannesmann-Mandrel Mill rolling process or the like. In a case where the final product is a steel plate or sheet, the hot working may include the typical process of manufacturing a steel plate or a hot rolled steel shoot in coil.

The end temperature of the hot working is not particularly defined, but may be preferably set to not less than 1000° C. This is because if the end temperature of the hot working is less than 1000° C., the dissolution of the carbonitrides of Nb, Ti and V becomes insufficient, and therefore the creep strength and ductility may be impaired.

The cold working can be carried out after the hot working. For instance, in a case where the final product is a steel pipe or tube, the cold working may include the cold drawing pipe manufacturing process in which the raw pipe produced by the above-mentioned hot working is subjected to drawing and/or the cold rolling pipe manufacturing process. In a case where the final product is a steel plate or sheet, the cold working may include the typical process of manufacturing a cold rolled steel sheet in coil. Furthermore, in order to homogenize the microstructure and to further stabilize the strength, it is preferable to apply strains on the materials and then to perform a heat treatment for obtaining the recrystallization and uniform grains. In order to apply strains, it is recommended that the final working in the case of cold working be carried out at a rate of reduction in area of not less than 10%.

The final heat treatment after the above-mentioned hot working or the final heat treatment after a further cold working following the hot working may be carried out at a heating temperature of not less than 1000° C. The upper limit of the said heating temperature is not particularly defined, but a temperature exceeding 1350° C. may cause not only high temperature intergranular cracking or a deterioration of ductility but also very coarse crystal grains. Moreover, the said temperature may cause a marked deterioration of workability. Therefore, the upper limit of the heating temperature is preferably set to 1350° C.

The following examples illustrate the present invention more specifically. These examples are, however, by no means limited to the scope of the present invention.

EXAMPLES

Austenitic stainless steels A1 to A10, B1 to B5, C1 and C2 and D1 to D5 having the chemical compositions shown in Tables 1 and 2 were melted using an electric furnace and cast to form ingots. Each ingot was hot worked by a hot forging and a hot rolling, and then, was subjected to a heat treatment comprising heating at 1100° C., followed by water cooling and, thereafter subjected to machining to produce steel plates having a thickness of 20 mm, a width of 50 mm and a length of 100 mm.

The steels D1 to D5 shown in Tables 1 and 2 are steels having chemical compositions which fall within the range regulated by the present invention. On the other hand, the steels B1 to B5 are steels of comparative examples in which one or more of the contents of the component elements and the values of the parameters F1 and F2 are out of the ranges regulated by the present invention. The steels A1 to A10 and C1 and C2 are steels of reference examples.

TABLE 1

| | Chemical composition (% by mass) The balance: Fe and impurities | | | | | | | | | | | | | | |
|---|---|---|---|---|---|---|---|---|---|---|---|---|---|---|---|
| Steel | C | Si | Mn | P | S | Cr | Ni | sol. Al | N | Nb | Ta | HF | Ti | V | Sn |
| A1 | 0.010 | 0.39 | 1.43 | 0.028 | 0.0010 | 17.76 | 10.65 | 0.002 | 0.088 | 0.31 | — | — | 0.004 | 0.068 | 0.004 |
| A2 | 0.009 | 0.42 | 1.50 | 0.022 | 0.0005 | 17.17 | 9.91 | 0.017 | 0.081 | 0.30 | 0.002 | — | 0.002 | 0.020 | 0.004 |
| A3 | 0.007 | 0.36 | 1.48 | 0.028 | 0.0005 | 17.16 | 9.95 | 0.029 | 0.081 | 0.31 | 0.002 | — | 0.003 | 0.040 | 0.002 |
| A4 | 0.008 | 0.37 | 1.48 | 0.022 | 0.0005 | 17.25 | 9.93 | 0.026 | 0.083 | 0.30 | 0.002 | — | 0.004 | 0.040 | 0.001 |
| A5 | 0.012 | 0.38 | 1.48 | 0.019 | 0.0005 | 17.17 | 9.88 | 0.018 | 0.076 | 0.29 | 0.002 | — | 0.002 | 0.020 | 0.003 |
| A6 | 0.014 | 0.46 | 1.74 | 0.028 | 0.0011 | 17.73 | 10.21 | 0.002 | 0.090 | 0.31 | 0.010 | — | 0.006 | 0.068 | 0.004 |
| A7 | 0.013 | 0.48 | 1.53 | 0.027 | 0.0004 | 17.24 | 9.86 | 0.015 | 0.082 | 0.32 | 0.010 | — | 0.005 | 0.060 | 0.003 |
| A8 | 0.012 | 0.29 | 1.47 | 0.027 | 0.0007 | 17.39 | 9.70 | 0.008 | 0.088 | 0.35 | 0.010 | — | 0.003 | 0.057 | 0.003 |
| A9 | 0.012 | 0.36 | 1.53 | 0.027 | 0.0005 | 17.30 | 10.02 | 0.023 | 0.076 | 0.31 | 0.010 | — | 0.003 | 0.063 | 0.004 |
| A10 | 0.011 | 0.25 | 1.19 | 0.006 | 0.0004 | 24.98 | 19.76 | 0.020 | 0.250 | 0.29 | — | — | 0.002 | 0.012 | 0.001 |
| B1 | 0.008 | 0.48 | 1.38 | 0.034 | 0.0230 | 17.42 | 9.96 | 0.002 | 0.080 | 0.42 | — | 0.01 | 0.080 | 0.050 | 0.092 |
| B2 | 0.009 | 0.33 | 1.41 | 0.028 | 0.0010 | 17.26 | 9.89 | 0.002 | 0.082 | 0.48 | 0.080 | 0.14 | 0.350 | 0.280 | 0.048 |
| B3 | 0.042 | 0.34 | 1.42 | 0.031 | 0.0020 | 17.25 | 9.94 | 0.004 | 0.079 | *1.02 | — | — | 0.005 | 0.055 | 0.006 |
| B4 | *0.250 | 0.34 | 1.45 | 0.024 | 0.0010 | 18.17 | 9.93 | 0.002 | 0.086 | 0.48 | 0.005 | — | 0.003 | 0.021 | 0.004 |

TABLE 1-continued

Chemical composition (% by mass) The balance: Fe and impurities

| Steel | C | Si | Mn | P | S | Cr | Ni | sol. Al | N | Nb | Ta | HF | Ti | V | Sn |
|---|---|---|---|---|---|---|---|---|---|---|---|---|---|---|---|
| B5 | 0.010 | 0.32 | 1.44 | 0.036 | 0.0060 | 17.80 | 9.95 | 0.002 | *0.007 | 0.45 | 0.010 | — | 0.003 | 0.035 | 0.003 |
| C1 | 0.014 | 0.38 | 1.48 | 0.016 | 0.0005 | 17.30 | 11.00 | 0.012 | 0.072 | 0.28 | — | — | 0.003 | 0.012 | 0.002 |
| C2 | 0.008 | 0.36 | 1.52 | 0.015 | 0.0004 | 17.40 | 9.71 | 0.016 | 0.064 | 0.29 | — | — | 0.003 | 0.025 | 0.003 |
| D1 | 0.008 | 0.37 | 0.85 | 0.025 | 0.0006 | 17.44 | 11.23 | 0.011 | 0.084 | 0.30 | 0.005 | — | 0.004 | 0.046 | 0.002 |
| D2 | 0.009 | 0.46 | 0.90 | 0.026 | 0.0007 | 17.48 | 11.78 | 0.023 | 0.088 | 0.34 | 0.010 | — | 0.003 | 0.036 | 0.004 |
| D3 | 0.011 | 0.36 | 0.94 | 0.025 | 0.0007 | 17.40 | 11.85 | 0.016 | 0.084 | 0.38 | 0.010 | — | 0.002 | 0.028 | 0.002 |
| D4 | 0.010 | 0.36 | 0.99 | 0.025 | 0.0008 | 17.52 | 11.99 | 0.018 | 0.086 | 0.31 | 0.006 | — | 0.002 | 0.040 | 0.002 |
| D5 | 0.008 | 0.40 | 0.90 | 0.024 | 0.0006 | 17.45 | 11.83 | 0.022 | 0.092 | 0.33 | 0.010 | — | 0.005 | 0.033 | 0.001 |

TABLE 2

Chemical composition (% by mass) The balance: Fe and impurities

| Steel | As | Zn | Pb | Sb | Others | Value of F1 | Value of [1.7-9 × F1] | Value of F2 |
|---|---|---|---|---|---|---|---|---|
| A1 | — | — | — | — | *— | 0.017 | 1.547 | 0.325 |
| A2 | 0.001 | — | — | — | *B: 0.0015 | 0.0137 | 1.5767 | 0.308 |
| A3 | 0.001 | — | — | — | *Ca: 0.001 | 0.0157 | 1.5587 | 0.322 |
| A4 | 0.001 | — | — | — | *Mo: 0.37 | 0.0122 | 1.5902 | 0.314 |
| A5 | 0.004 | — | — | — | *Cu: 0.08 | 0.0123 | 1.5893 | 0.298 |
| A6 | — | — | — | — | *Co: 0.21 | 0.0171 | 1.5461 | 0.339 |
| A7 | — | 0.002 | — | 0.002 | *Cu: 0.2, Mo: 0.37 | 0.0162 | 1.5542 | 0.346 |
| A8 | — | — | 0.001 | — | *Cu: 0.21, B: 0.0015, Co: 0.44 | 0.0159 | 1.5569 | 0.372 |
| A9 | — | — | — | — | *Cu: 0.26, Mo: 0.46, Co: 0.12, B: 0.0019 | 0.016 | 1.556 | 0.332 |
| A10 | — | — | — | — | *Zr: 0.02, Nd: 0.015 | 0.0039 | 1.6649 | 0.295 |
| B1 | 0.008 | 0.007 | — | — | Cu: 0.27, Co: 0.14 | * 0.089 | 0.899 | 0.595 |
| B2 | 0.005 | — | 0.006 | — | *Mo: 0.37 | 0.0412 | 1.3292 | * 1.428 |
| B3 | 0.002 | — | — | — | *B: 0.0016 | 0.0209 | 1.5119 | 1.036 |
| B4 | 0.002 | 0.001 | — | — | *B: 0.0015, Co: 0.17 | 0.0156 | 1.5596 | 0.493 |
| B5 | — | — | — | — | *Cu: 0.18, B: 0.0016 | 0.0255 | 1.4705 | 0.470 |
| C1 | — | — | — | — | Cu: 2.95, B: 0.003 | 0.0093 | 1.6163 | 0.287 |
| C2 | — | — | — | — | Cu: 2.98 | 0.0094 | 1.6154 | 0.299 |
| D1 | — | — | — | — | Cu: 2.44, Co: 0.36 | 0.0141 | 1.5731 | 0.318 |
| D2 | — | — | — | — | Cu: 0.77, Co0.28, B: 0.0020 | 0.0157 | 1.5587 | 0.360 |
| D3 | — | — | — | — | Cu: 1.55, Mo: 0.85, Co: 0.20 | 0.0142 | 1.5722 | 0.397 |
| D4 | — | — | — | — | Cu: 0.96, Co: 0.22 | 0.0143 | 1.5713 | 0.324 |
| D5 | — | — | — | — | Cu: 0.45, Mo: 0.41, Co: 0.14, B: 0.0020 | 0.0131 | 1.5821 | 0.353 |

F1 = S + {(P + Sn)/2} + {(As + Zn + Pb + Sb)/5}
F2 = Nb + Ta + Zr + Hf + 2Ti + (V/10)
The mark *indicates falling outside the conditions regulated by the present invention.

First, the steel plates made of the steels A1 to A10, B1 to B5, C1 and C2 and D1 to D5 were machined for providing each of them with a shape of V-groove with an angle of 30° in the longitudinal direction and a root thickness of 1 mm. Then each of them was subjected to four side-restrained welding onto a commercial SM400C steel plate, 25 mm in thickness, 200 mm in width and 200 mm in length, as standardized in JIS G 3106 (2004) using "DNiCrFe-3" defined in JIS Z 3224 (1999) as a covered electrode.

Thereafter, each steel plate was subjected to multilayer welding in the groove using a welding wire having the chemical compositions shown in Table 3 by the TIG welding method under the heat input condition of 20 kJ/cm.

TABLE 3

Chemical composition (% by mass) The balance: Fe and impurities

| C | Si | Mn | P | S | Ni | Cr | Nb | N |
|---|---|---|---|---|---|---|---|---|
| 0.032 | 0.32 | 1.5 | 0.015 | 0.003 | 6.95 | 19.37 | 0.38 | 0.19 |

After the above welding procedure, 10 test specimens for microstructure observations of the joint section were taken from each test object and were subjected to sectional mirror-like polishing and then to etching and observed for the occurrence of liquation cracking in the coarse-grained HAZ using an optical microscope at a magnification of 500.

The results of the above-mentioned liquation cracking investigation are shown in Table 4. The symbol "o" in the column "liquation cracking" in Table 4 indicates that no liquation cracking was observed in all the 10 test specimens for the relevant steels and the symbol "Δ" indicates that cracking was observed in one or two of the test specimens.

TABLE 4

| Test No. | Steel | Liquation cracking | Embrittling cracking | SSC resistance | Creep characteristics | Note |
|---|---|---|---|---|---|---|
| 1 | * A1 | o | o | o | o | Reference example |
| 2 | * A2 | o | o | o | o | |
| 3 | * A3 | o | o | o | o | |
| 4 | * A4 | o | o | o | o | |
| 5 | * A5 | o | o | o | o | |
| 6 | * A6 | o | o | o | o | |
| 7 | * A7 | o | o | o | o | |
| 8 | * A8 | o | o | o | o | |
| 9 | * A9 | o | o | o | o | |
| 10 | * A10 | o | o | o | o | |
| 11 | * B1 | Δ | x | Δ | o | Comparative |
| 12 | * B2 | Δ | Δ | Δ | o | |

TABLE 4-continued

| Test No. | Steel | Liquation cracking | Embrittling cracking | SSC resistance | Creep characteristics | Note |
|---|---|---|---|---|---|---|
| 13 | * B3 | Δ | Δ | x | o | example |
| 14 | * B4 | Δ | Δ | x | o |  |
| 15 | * B5 | o | o | o | x |  |
| 16 | * C1 | o | o | o | o | Reference |
| 17 | * C2 | o | o | o | o | example |
| 18 | D1 | o | o | o | o | Inventive |
| 19 | D2 | o | o | o | o | example |
| 20 | D3 | o | o | o | o |  |
| 21 | D4 | o | o | o | o |  |
| 22 | D5 | o | o | o | o |  |

The mark * indicates falling outside the conditions regulated by the present invention.

From Table 4, it is evident that no liquation cracking occurred in Test Nos. 18 to 22 which are taken as inventive examples and in which the steels D1 to D5 according to the present invention were used.

The restraint-welded joint specimens obtained from the steels A1 to A10, B1 to B5, C1 and C2 and D1 to D5 in the manner mentioned above were subjected to aging heat treatment at 550° C. for 10000 hours. In order to observe the microstructure of the joint section, 4 test specimens were taken from each test object. The section of each specimen was mirror-like polished, then etched and observed for the occurrence of embrittling cracking in the coarse-grained HAZ using an optical microscope at a magnification of 500.

The results of the above-mentioned embrittling cracking investigation are also shown in Table 4. The symbol "o" in the column "embrittling cracking" indicates that no embrittling cracking was observed in all the 4 test specimens for the relevant steels. The symbol "Δ" indicates that cracking was observed in one or two test specimens and the symbol "x" indicates that cracking was observed in 3 or more test specimens.

From Table 4, it is evident that no embrittling cracking also occurred in Test Nos. 18 to 22 which are taken as inventive examples and in which the steels D1 to D5 according to the present invention were used.

From the data given above, it is evident that, in order to ensure the excellent liquation cracking resistance and the excellent embrittling cracking resistance during a long period of use in the HAZ, the conditions concerning not only the contents of the respective component elements, but also the parameters F1 and F2 should be satisfied.

Furthermore, welded joints were prepared from the steels A1 to A10, B1 to B5, C1 and C2 and D1 to D5 using the same welding material under the same welding conditions as the above-mentioned restraint-welded joints except that no restraint was applied. The following test specimens were taken from each test object and evaluated for corrosion resistance and the high temperature strength characteristics (i.e. the "creep characteristics").

In order to investigate corrosion resistance, the so-called "U-bend test specimens", namely rectangular shaped specimens, 2 mm in thickness, 10 mm in width and 75 mm in length and restrained at a radius of 5 mm with the site of welding as the center, were used. They were immersed in the Wackenroder's solution (solution prepared by blowing a large amount of $H_2S$ gas into a saturated aqueous solution of $H_2SO_3$ prepared by blowing $SO_2$ gas into distilled water) at 700° C. for 1000, 3000 or 5000 hours and then observed under an optical microscope at a magnification of 500 for the occurrence of cracking to evaluate the polythionic acid SCC resistance of each welded joint.

In order to investigate high temperature strength characteristics, round bar creep test specimens having a parallel portion, 6 mm in diameter and 60 mm in length, with the weld metal as the center were used, and a creep rupture test was carried out under conditions of 600° C. and 200 MPa. When the fracture time was not less than 5000 hours, the test specimen was judged "acceptable" as capable of accomplishing the objective of the present invention.

The results of the above-mentioned investigations of polythionic acid SCC resistance and high temperature strength characteristics (i.e. creep characteristics) are also shown in Table 4. The column "SCC resistance" in Table 4 means the above-mentioned polythionic acid SCC resistance, in which the symbol "o" means that no cracking occurred during 5000 hours of immersion. The symbol "Δ" means that cracking was observed during 3000 hours of immersion and the symbol "x" means that cracking was observed during 1000 hours of immersion. Further, in the column "Creep characteristics", the symbol "o" means that the rupture time was not less than 5000 hours and the symbol "x" means that the rupture time was less than 5000 hours.

As for the corrosion resistance, it was found from Table 4 that cracking occurred during 1000 hours of immersion in Test Nos. 13 and 14 which are taken as comparative examples and in which the steels B3 and B4, having the contents of Nb and C exceed the upper limits regulated by the present invention respectively, were used. It was also found that, cracking occurred during 3000 hours of immersion in Test Nos. 11 and 12 which are taken as comparative examples and in which the steels B1 and B2, having the values of parameter F1 and parameter F2 fall outside the range regulated by the present invention respectively, were used. Therefore, it is clear that these steels are inferior in corrosion resistance (polythionic acid SCC resistance). As for the high temperature strength characteristics, the rupture time was less than 5000 hours in Test No. 15 which is taken as a comparative example and in which the steel B5, having the N content less than the value regulated by the present investigation, was used. Consequently, it is clear that this steel is inferior in high temperature characteristics.

INDUSTRIAL APPLICABILITY

The austenitic stainless steels of the present invention have excellent liquation cracking resistance and embrittling cracking resistance in a weld zone, and moreover they have excellent polythionic acid SCC resistance and high temperature strength. Consequently, they can be used as raw materials for various apparatuses which are used in a sulfide-containing environment at high temperatures for a long period of time; for example in power plant boilers, petroleum refining and petrochemical plants and so on.

What is claimed is:

1. A heating furnace pipe made from an austenitic stainless steel, which consists of by mass percent, C: not more than 0.02%, Si: not more than 1.5%, Mn: not more than 2%, Cr: 17 to 25%, Ni: 9 to 13%, Cu: more than 0.26% to less than 2.95%, N: 0.06 to 0.35%, sol. Al: 0.008 to 0.03%, an amount of Co, the Co amount 0.03 to 1.0%, an amount of Ta, the Ta amount not more than 0.2%, an amount of Nb, the Nb amount not more than 0.5%, an amount of V, the amount of V not more than 0.4%, an amount of Ti, the amount of Ti not more than 0.4% and further contains one or more elements selected from Hf: not more than 0.2% and Zr: not more than 0.2%, with the balance being Fe and impurities, in which the contents of P, S, Sn, As, Zn, Pb and Sb among the impurities are P: up to 0.04%, S: up to 0.03%, Sn: up to 0.1%, As: not more than 0.01%, Zn: not more than 0.01%, Pb: not more than 0.01% and Sb: not more than 0.01%, and the values of F1 and F2 defined respectively by the following formula (1) and formula (2) satisfy the conditions F1≤0.075 and 0.05≤F2≤1.7-9×F1;

$$F1=S+\{(P+Sn)/2\}+\{(As+Zn+Pb+Sb)/5\} \quad (1),$$

$$F2=Nb+Ta+Zr+Hf+2Ti+(V/10) \quad (2);$$

wherein each element symbol in the formulas (1) and (2) represents the content by mass percent of the element concerned.

2. A heating furnace pipe made from an austenitic stainless steel, which consists of by mass percent, C: not more than 0.02%, Si: not more than 1.5%, Mn: not more than 2%, Cr: 17 to 25%, Ni: 9 to 13%, Cu: more than 0.26% to less than 2.95%, N: 0.06 to 0.35%, sol. Al: 0.008 to 0.03%, an amount of Co, the Co amount 0.03 to 1.0%, an amount of Ta, the Ta amount not more than 0.2%, an amount of Nb, the Nb amount not more than 0.5%, an amount of V, the amount of V not more than 0.4%, an amount of Ti, the amount of Ti not more than 0.4%, and further contains one or more elements selected from Hf: not more than 0.2% and Zr: not more than 0.2%, with the balance being Fe and impurities, in which the contents of P, S, Sn, As, Zn, Pb and Sb among the impurities are P: up to 0.04%, 5: up to 0.03%, Sn: up to 0.1%, As: not more than 0.01%, Zn: not more than 0.01%, Pb: not more than 0.01% and Sb: not more than 0.01%, and the values of F1 and F2 defined respectively by the following formula (1) and formula (2) satisfy the conditions F1≤0.075 and 0.05≤F2≤1.7-9×F1;

$$F1=S+\{(P+Sn)/2\}+\{(As+Zn+Pb+Sb)/5\} \quad (1),$$

$$F2=Nb+Ta+Zr+Hf+2Ti+(V/10) \quad (2);$$

wherein each element symbol in the formulas (1) and (2) represents the content by mass percent of the element concerned, wherein the austenitic stainless steel further consists of, by mass percent, one or more elements of one or more groups selected from the first to third groups listed below in lieu of a part of Fe:
 first group: Mo: not more than 5%;
 second group: B: not more than 0.012%; and
 third group: Ca: not more than 0.02%, Mg: not more than 0.02% and rare earth element: not more than 0.1%.

3. A facility comprising power plant boilers, or petroleum refining or petrochemical plants, the power plant boilers, or petroleum refining or petrochemical plants including components, each component exposed to polythionic acid made from an austenitic stainless steel, which consists of by mass percent, C: not more than 0.02%, Si: not more than 1.5%, Mn: not more than 2%, Cr: 17 to 25%, Ni: 9 to 13%, Cu: more than 0.26% to less than 2.95%, N: 0.06 to 0.35%, sol. Al: 0.008 to 0.03%, an amount of Co, the Co amount 0.03 to 1.0%, an amount of Ta, the Ta amount not more than 0.2%, an amount of Nb, the Nb amount not more than 0.5%, an amount of V, the amount of V not more than 0.4%, an amount of Ti, the amount of Ti not more than 0.4%, and further contains one or more elements selected from Hf: not more than 0.2% and Zr: not more than 0.2%, with the balance being Fe and impurities, in which the contents of P, S, Sn, As, Zn, Pb and Sb among the impurities are P: up to 0.04%, S: up to 0.03%, Sn: up to 0.1%, As: not more than 0.01%, Zn: not more than 0.01%, Pb: not more than 0.01% and Sb: not more than 0.01%, and the values of F1 and F2 defined respectively by the following formula (1) and formula (2) satisfy the conditions F1≤0.075 and 0.05≤F2≤1.7-9×F1;

$$F1=S+\{(P+Sn)/2\}+\{(As+Zn+Pb+Sb)/5\} \quad (1),$$

$$F2=Nb+Ta+Zr+Hf+2Ti+(V/10) \quad (2);$$

wherein each element symbol in the formulas (1) and (2) represents the content by mass percent of the element concerned.

4. The facility of claim 3, wherein the N content ranges from 0.06 to 0.10%.

5. The facility of claim 3, wherein the component is a heating furnace pipe.

6. A facility comprising power plant boilers, or petroleum refining or petrochemical plants, the power plant boilers, or petroleum refining or petrochemical plants including components, each component exposed to polythionic acid made from an austenitic stainless steel, which consists of by mass percent, C: not more than 0.02%, Si: not more than 1.5%, Mn: not more than 2%, Cr: 17 to 25%, Ni: 9 to 13%, Cu: more than 0.26% to less than 2.95%, N: 0.06 to 0.35%, sol. Al: 0.008 to 0.03%, an amount of Co, the Co amount 0.03 to 1.0%, an amount of Ta, the Ta amount not more than 0.2%, an amount of Nb, the Nb amount not more than 0.5%, an amount of V, the amount of V not more than 0.4%, an amount of Ti, the amount of Ti not more than 0.4%, and further contains one or more elements selected from Hf: not more than 0.2% and Zr: not more than 0.2%, with the balance being Fe and impurities, in which the contents of P, S, Sn, As, Zn, Pb and Sb among the impurities are P: up to 0.04%, 5: up to 0.03%, Sn: up to 0.1%, As: not more than 0.01%, Zn: not more than 0.01%, Pb: not more than 0.01% and Sb: not more than 0.01%, and the values of F1 and F2 defined respectively by the following formula (1) and formula (2) satisfy the conditions F1≤0.075 and 0.05≤F2≤1.7-9×F1;

$$F1=S+\{(P+Sn)/2\}+\{(As+Zn+Pb+Sb)/5\} \quad (1),$$

$$F2=Nb+Ta+Zr+Hf+2Ti+(V/10) \quad (2);$$

wherein each element symbol in the formulas (1) and (2) represents the content by mass percent of the element concerned, wherein the austenitic stainless steel further consists of, by mass percent, one or more elements of one or more groups selected from the first to third groups listed below in lieu of a part of Fe:
 first group: Mo: not more than 5%;
 second group: B: not more than 0.012%; and
 third group: Ca: not more than 0.02%, Mg: not more than 0.02% and rare earth element: not more than 0.1%.

7. The facility of claim 6, wherein the N content ranges from 0.06 to 0.10%.

8. The facility of claim 6, wherein the component is a heating furnace pipe.

9. A method of suppressing polythionic acid stress corrosion cracking in components present in a power plant boiler, or a petroleum refining or petrochemical plant comprising:
 providing a raw material as an austenitic stainless steel, which consists of by mass percent, C: not more than 0.02%, Si: not more than 1.5%, Mn: not more than 2%, Cr: 17 to 25%, Ni: 9 to 13%, Cu: more than 0.26% to less than 2.95%, N: 0.06 to 0.35%, sol. Al: 0.008 to 0.03%, an amount of Co, the Co amount 0.03 to 1.0%, an amount of Ta, the Ta amount not more than 0.2%, an amount of Nb, the Nb amount not more than 0.5%, an amount of V, the amount of V not more than 0.4%, an amount of Ti, the amount of Ti not more than 0.4%, and further contains one or more elements selected from Hf: not more than 0.2% and Zr: not more than 0.2%, with the balance being Fe and impurities, in which the contents of P, S, Sn, As, Zn, Pb and Sb among the impurities are P: up to 0.04%, S: up to 0.03%, Sn: up to 0.1%, As: not more than 0.01%, Zn: not more than 0.01%, Pb: not more than 0.01% and Sb: not more than 0.01%, and the values of F1 and F2 defined respectively by the following formula (1) and formula (2) satisfy the conditions F1≤0.075 and 0.05≤F2≤1.7-9× F1;

$$F1=S+\{(P+Sn)/2\}+\{(As+Zn+Pb+Sb)/5\} \quad (1),$$

$$F2=Nb+Ta+Zr+Hf+2Ti+(V/10) \quad (2);$$

wherein each element symbol in the formulas (1) and (2) represents the content by mass percent of the element concerned; and forming components from the austenitic stainless steel; and using the components in the power plant boiler, or a petroleum refining or petrochemical plant where polythionic acid stress corrosion cracking can occur.

10. The method of claim 9, wherein the N content ranges from 0.06 to 0.10%.

11. A method of suppressing polythionic acid stress corrosion cracking in components present in a power plant boiler, or a petroleum refining or petrochemical plant comprising:

providing a raw material as an austenitic stainless steel, which consists of by mass percent, C: not more than 0.02%, Si: not more than 1.5%, Mn: not more than 2%, Cr: 17 to 25%, Ni: 9 to 13%, Cu: more than 0.26% to less than 2.95%, N: 0.06 to 0.35%, sol. Al: 0.008 to 0.03%, an amount of Co, the Co amount 0.03 to 1.0%, an amount of Ta, the Ta amount not more than 0.2%, an amount of Nb, the Nb amount not more than 0.5%, an amount of V, the amount of V not more than 0.4%, an amount of Ti, the amount of Ti not more than 0.4%, and further contains one or more elements selected from Hf: not more than 0.2% and Zr: not more than 0.2%, with the balance being Fe and impurities, in which the contents of P, S, Sn, As, Zn, Pb and Sb among the impurities are P: up to 0.04%, S: up to 0.03%, Sn: up to 0.1%, As: not more than 0.01%, Zn: not more than 0.01%, Pb: not more than 0.01% and Sb: not more than 0.01%, and the values of F1 and F2 defined respectively by the following formula (1) and formula (2) satisfy the conditions F1≤0.075 and 0.05≤F2<1.7-9× F1;

$$F1=S+\{(P+Sn)/2\}+\{(As+Zn+Pb+Sb)/5\} \quad (1),$$

$$F2=Nb+Ta+Zr+Hf+2Ti+(V/10) \quad (2);$$

wherein each element symbol in the formulas (1) and (2) represents the content by mass percent of the element concerned, wherein the austenitic stainless steel further consists of, by mass percent, one or more elements of one or more groups selected from the first to third groups listed below in lieu of a part of Fe:

first group: Mo: not more than 5%;
second group: B: not more than 0.012%; and
third group: Ca: not more than 0.02%: not more than 0.02% and rare earth element: not more than 0.1%; and forming components from the austenitic stainless steel; and using the components in the power plant boiler, or a petroleum refining or petrochemical plant where polythionic acid stress corrosion cracking can occur.

12. The method of claim 11, wherein the N content ranges from 0.06 to 0.10%.

* * * * *

UNITED STATES PATENT AND TRADEMARK OFFICE
CERTIFICATE OF CORRECTION

PATENT NO.       : 11,866,814 B2
APPLICATION NO.  : 16/750137
DATED            : January 9, 2024
INVENTOR(S)      : Takahiro Osuki et al.

Page 1 of 1

It is certified that error appears in the above-identified patent and that said Letters Patent is hereby corrected as shown below:

In the Claims

In Column 21, Line 27:
"are P: up to 0.04%, 5: up to 0.03%, Sn: up to 0.1%, As: not"
Should read:
"are P: up to 0.04%, S: up to 0.03%, Sn: up to 0.1%, As: not"

In Column 22, Line 33:
"0.04%, 5: up to 0.03%, Sn: up to 0.1%, As: not more than"
Should read:
"0.04%, S: up to 0.03%, Sn: up to 0.1%, As: not more than"

Signed and Sealed this
Seventh Day of May, 2024

Katherine Kelly Vidal
*Director of the United States Patent and Trademark Office*